Aug. 9, 1927.

M. H. WOLFF 1,638,228

DIFFERENTIAL DRIVE FOR VEHICLES

Filed Nov. 23, 1925 4 Sheets-Sheet 1

Inventor.
Mahlon H. Wolff
By R. S. Berry
Att'y.

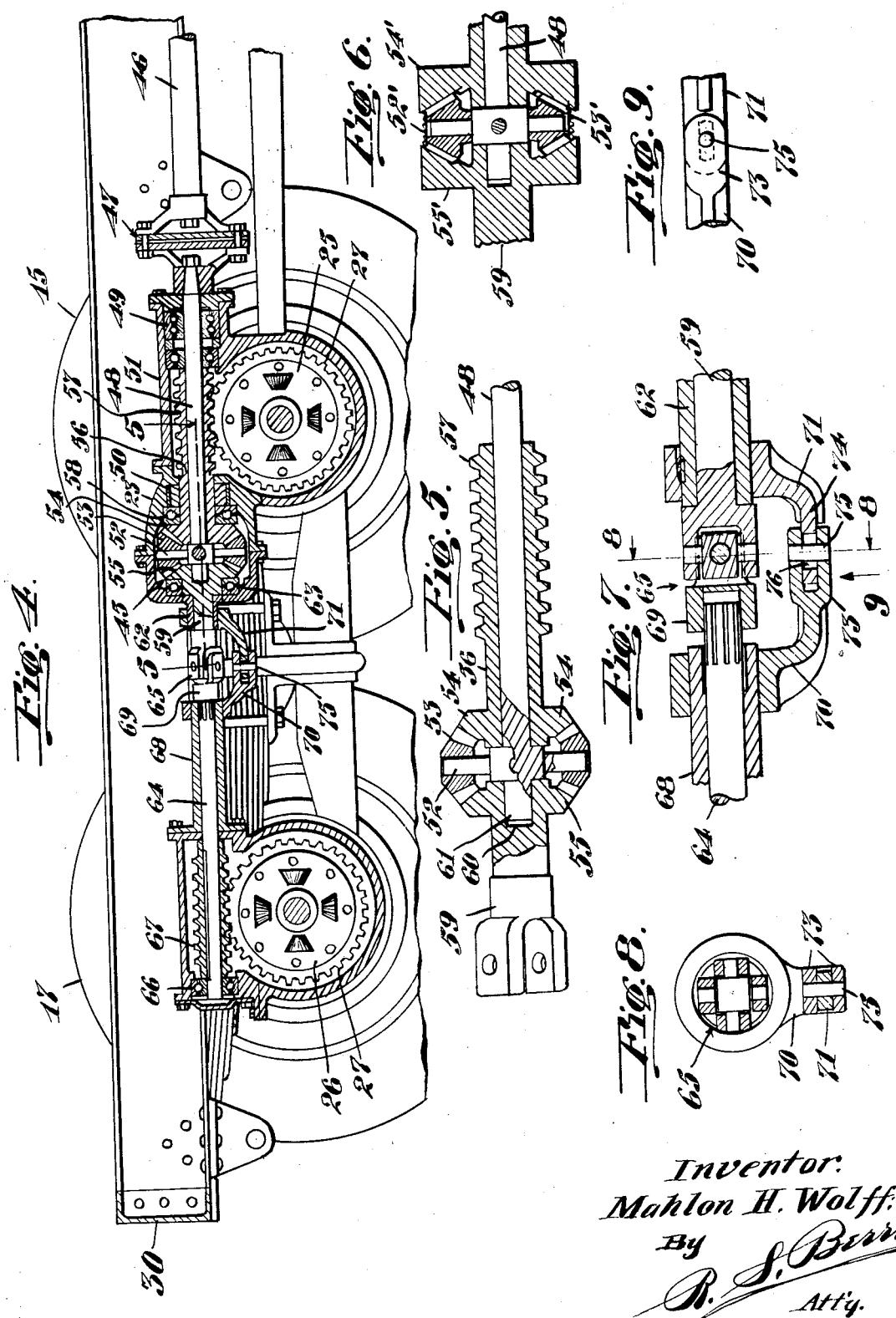

Aug. 9, 1927.

M. H. WOLFF 1,638,228

DIFFERENTIAL DRIVE FOR VEHICLES

Filed Nov. 23, 1925

Inventor
Mahlon H. Wolff
By R. S. Berry
Att'y.

Aug. 9, 1927.

M. H. WOLFF 1,638,228

DIFFERENTIAL DRIVE FOR VEHICLES

Filed Nov. 23, 1925 4 Sheets-Sheet 4

Inventor
Mahlon H. Wolff
By R. S. Burn
Atty.

Patented Aug. 9, 1927.

1,638,228

UNITED STATES PATENT OFFICE.

MAHLON H. WOLFF, OF LOS ANGELES, CALIFORNIA.

DIFFERENTIAL DRIVE FOR VEHICLES.

Application filed November 23, 1925. Serial No. 70,915.

This invention relates to the propulsion of motor vehicles, and particularly pertains to a mechanism for driving a plurality of pairs of vehicle wheels through the medium of a plurality of differentials, and more especially relates to four wheel rear end drives such as are employed on trucks, busses and similar heavy duty motor vehicles.

An object of the invention is to provide a mechanism of the above character embodying means whereby full compensation of any two pairs of driven wheels, or any one wheel, or any combination of wheels of a multiple pair drive may be effected from a single source of power, and which embodies a construction whereby a driving load may be equally divided and uniformly applied to two or more parallel axles and at the same time permit the axles to oscillate around a common axis in parallel planes.

Another object is to provide a differential drive of the above character which is highly efficient, durable, of simple construction, the parts of which may be readily assembled, and which is adapted to be applied to most types of vehicles now generally in use employing multiple pairs of driving wheels.

The invention resides generally in the provision of a mounting for at least two rear axles whereby the latter will be positioned to extend longitudinally on parallel vertical planes yet be permitted to oscillate vertically or move vertically independently of each other, and in providing a means for driving said axles simultaneously and equally from a single source of power through differential gearing embodied in said shafts.

The invention further resides in the parts and in the construction, combination and arrangement of parts, hereinafter described and claimed and illustrated by way of example in the accompanying drawings, in which:—

Fig. 4 is a sectional view on the line 4—4 of Fig. 1;

Fig. 5 is a detail in section and elevation of the differential drive as seen on the line 5—5 of Fig. 4;

Fig. 6 is a view of a modification of the differential drive;

Fig. 7 is a detail of the universal connection in the drive extending between the pair of axles;

Fig. 8 is a detail in section as seen on the line 8—8 of Fig. 7;

Fig. 9 is an inverted plan view as seen in the direction indicated by the arrow 9 in Fig. 7;

Figure 1:
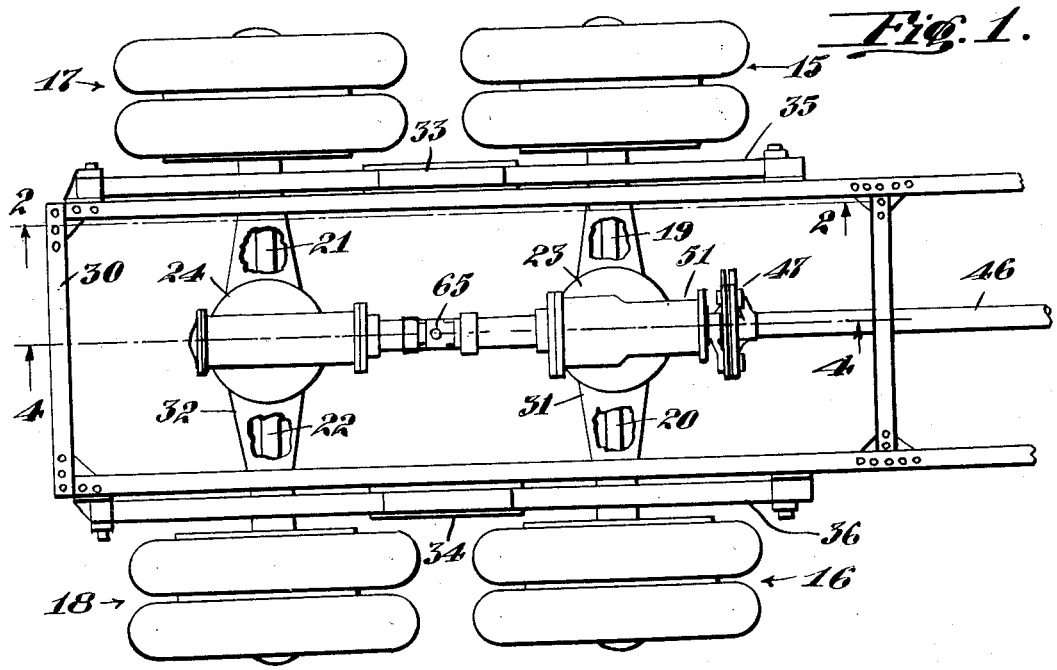
Fig. 1 is a plan view illustrating the application of the invention.
Figure 10:
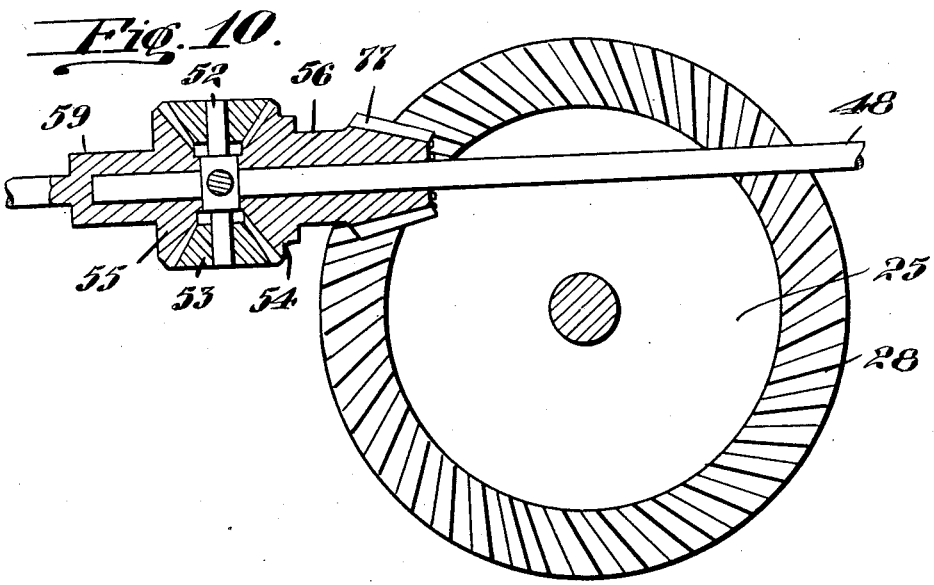
Figs. 10 and 11 are details illustrating modifications of the differential drive.
Figure 11:
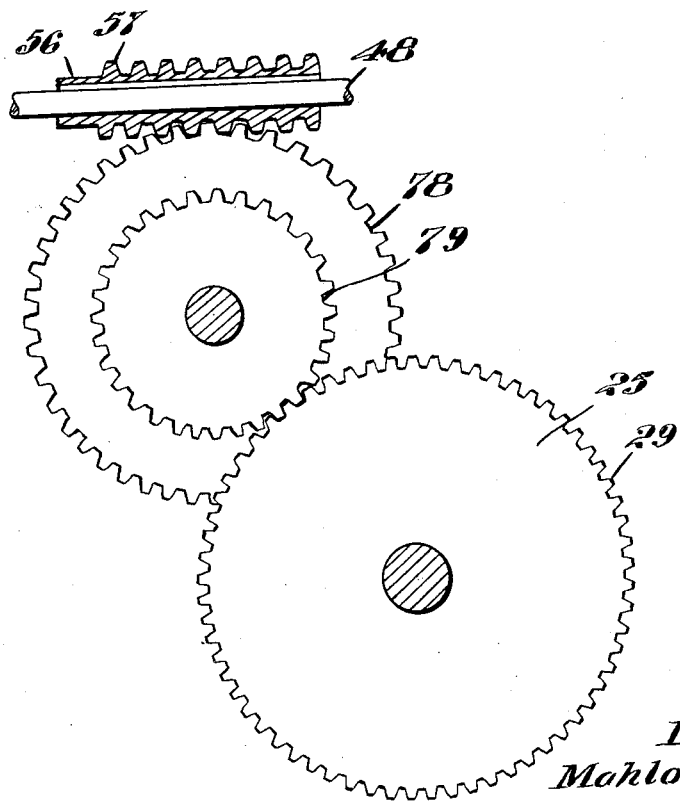

Referring to the drawings more specifically, 15 and 16 indicate one pair of driving wheels and 17 and 18 designate another pair of driving wheels; the pairs of driving wheels constituting multiple pair drive wheels of the rear truck of a vehicle. The wheels 15 and 16 are carried on aligned axles 19 and 20 and the wheels 17 and 18 are carried on aligned axles 21 and 22, each of the axles being journalled in suitable bearings and encased in suitable housings as is common in motor vehicle construction. In the preferred embodiment of the invention illustrated in Figs. 1, 2 and 4, a differential gear arranged in a housing 23 is interposed between the pair of aligned axles 19 and 20, and a differential gear arranged in a housing 24 is interposed between the pair of aligned axles 21 and 22; the differential gears being of the conventional type ordinarily employed in the rear end drives of automobiles, motor trucks and the like. The differential gear in the housing 23 embodies the usual ring gear 25 and the differential gear in the housing 24 embodies the usual ring gear 26, which gears are complementary and are ordinarily formed with worm-gear teeth 27, as shown in Fig. 4, but which may be formed with side spiral teeth 28 as shown in Fig. 10, or with spur teeth 29 as shown in Fig. 11; the latter being employed where a double reduction in the differential gear is required.

Figure 2:
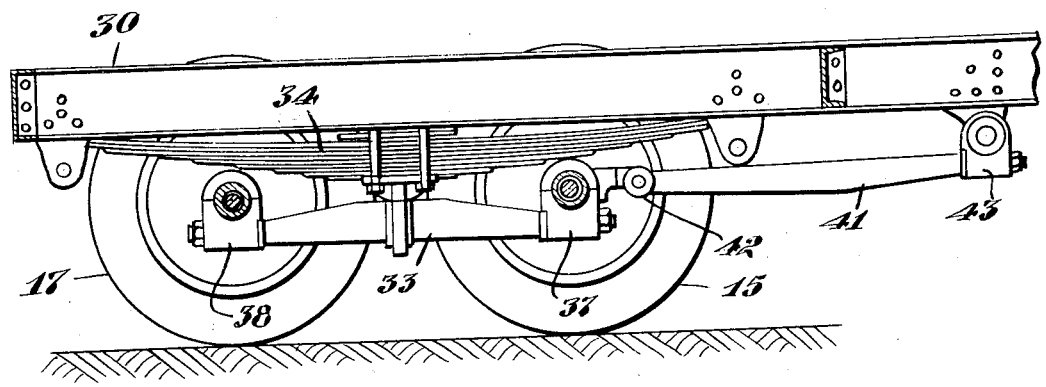
Fig. 2 is a view as seen on the line 2—2 of Fig. 1.
Figure 3:
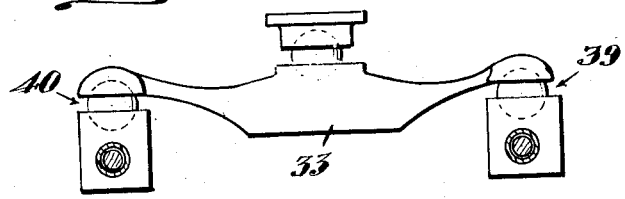
Fig. 3 is a detail in elevation illustrating a modified form of the truck side members connecting a pair of axles.

The axles carrying the multiple pairs of driving wheels may be mounted in any desired manner to afford a support for the rear end portion of the vehicle frame 30 but are preferably arranged as here shown, that is with the aligned axles 19 and 20 journalled in a housing 31 and the aligned axles 21 and 22 journalled in a housing 32 and with the opposite ends of the housings 31 and 32 affixed at their end portions to the opposite ends of a pair of beams 33 and 34 constituting the side members of the truck, and on which beams the vehicle frame is supported through the medium of springs 35 and 36 interposed between the beams and the vehicle frame in an ordinary manner. The housings 31 and 32 may be connected to the beams 33 and 34 by means of sleeves 37 and 38 encircling the housing and having portions depending therefrom pivoted for lateral swinging movement on the beams 33 and 34 as shown in Fig. 2, or the beams and housings may be connected together through the medium of ball and socket joints 39 and 40 as shown in Fig. 3. The connection between the axle housings and the truck is such as to permit longitudinal rocking movement of the housings with relation to the truck beams and also permit longitudinal rocking movement of the truck beams with relation to the housings. A torque rod 41 connects with the forward portion of the truck through the medium of a universal joint 42 and is connected at its forward end with the vehicle frame 30 through a universal joint 43. By thus arranging the truck elements the driving wheels 15, 16, 17 and 18 may move vertically independently of each other so that each truck wheel will bear uniformly on the surface being traversed thereby irrespectively of irregularity in its contour.

In carrying out my invention, means are provided for impelling the driving wheels collectively through the differential gears by power applied to the ring gears 25 and 26 through the instrumentality of a compensating gear indicated generally at 45, which, with the action of the differential gears between each pair of the driving wheels will serve to compensate for varying peripheral speeds of the several driving wheels with relation to each other. The compensating gear is driven from a drive shaft 46 actuated by a suitable motor with which the vehicle is equipped, and from which compensating gear the ring gears of the differentials are collectively but independently driven as will now be explained. Connecting with the drive shaft 46 through a universal joint 47 is a first motion shaft 48 which leads over the forward differential and is journalled in suitable bearings 49 and 50 carried in a housing 51 affixed to the differential housing 23 and which shaft carries a spider 52 or similar supporting structure carrying a plurality of beveled gears 53 intermeshing with opposed and independent beveled gears 54 and 55. The gear 54 is carried on a sleeve 56 which encircles the first motion shaft 48 and is turnable in relation thereto, and formed on the sleeve 56 is a worm gear 57 connecting with the teeth 27 on the ring gear 25. The sleeve 56 is journalled in the bearing 50 and interposed between the gear 54 and the bearing 50 is an end thrust bearing 58.

The gear 55 is formed on a shaft 59 which extends in alignment with the shaft 48; the gear 55 being formed with an axial recess 60 in which the outer end 61 of the shaft 48 is rotatable. The shaft 59 is journalled in a bearing 62 and interposed between the bearing 62 and gear 55 is an end thrust bearing 63. The shaft 59 connects with a shaft 64 through a universal joint 65 as shown in Fig. 7, which shaft 64 extends substantially in alignment with the shafts 59 and 48, but is adapted to assume an angularly disposed position in relation to the axis of the shaft 59 by reason of the universal joint 65. The shaft 64 extends over the ring gear 26 and is journalled at its outer end in a bearing 66; the inner end portion of the shaft 64 being journalled in a sleeve 68 extending forward of the differential housing 24. Keyed on the shaft 64 is a worm wheel 67 meshing with the teeth 27 on the ring gear 26.

The inner end of the shaft 64 has splined engagement with a sleeve 69 embodied in the universal joint 65 to permit longitudinal movement of the shaft 64 relative to the shaft 59. The universal joint 65 is located on a plane midway between the axes of the wheel axles and serves as a means of permitting the pairs of driving wheels to assume various positions with relation to each other and relieves strains imposed on the shafts 59 and 64 tending to throw them out of alignment.

As a means for preventing the shafts 59 and 64 from moving vertically with relation to each other yet permit the shafts being disposed slightly out of alignment horizontally and also neutralize strains due to driving torque, the housings encompassing the shafts 59 and 64 are connected together as shown in Fig. 7; there being a pair of dependent hangers 70 and 71 affixed relatively to the sleeve 68 encompassing the shaft 64 and sleeve 62 encompassing the shaft 59 which hangers are interconnected by means of a yoke 73 carried by the hanger 70 and extending horizontally therefrom between the side members of which yoke extends horizontal extension 74 on the hanger 71. A pivot pin 75 carried by the yoke 73 extends through an elongated slot 76 formed in the extension 74 which pin normally extends substantially in vertical axial alignment with the pivotal center of the universal joint 65. The connection between the yoke 73 and the member 74 is such as to inhibit vertical rocking movement of the hangers 70 and 71 with relation to each other but permits horizontal rocking thereof on the pivot pin 75 and also allows slight longitudinal movement of the yoke 73 and extension 74 in relation to each other. The hanger 70 is fixed on the sleeve 68 and the hanger 71 is turnable axially of the sleeve 62 to permit longitudinal oscillation of the pair of axles relatively to each other around the axes of the shafts 48 and 64.

In the construction shown in Fig. 10, a beveled pinion 77 is employed in lieu of the worm gear 57 on the sleeve 56; the teeth of the pinion 77 being spiralled to engage the spiral teeth 28 on the ring gear 25. This arrangement is employed where it is desirable to drive to the side of the ring gear instead of to the periphery thereof. In the construction shown in Fig. 11 rotation of the ring gear is effected through the medium of double reduction gears 78 and 79; the gear 78 being formed with teeth adapted to be engaged with the worm gear 57 or 67 and the gear 79 being formed with spur teeth to engage spur teeth 29 of the ring gear.

In the operation of the preferred form of the invention just described, rotation of the drive shaft 46 effects rotation of the first motion shaft 48 and operates through the compensating gear assemblage 45 to effect rotation of the worm gears 57 and 67 and thereby revolve the ring gears 25 and 26 in unison so as to drive the pairs of driving wheels through their axes and the differential gears in which the ring gears are embodied.

It will be understood that the forward pair of driving wheels 15 and 16 may have different peripheral speeds with relation to each other through the action of the differential gears interposed between their axle members, and that in like manner the rear pair of driving wheels 17 and 18 may have different peripheral speeds relative to each other by reason of the action of the differential gears in the housing 24 interposed between the axle members of these wheels, and it will be seen that by the provision of the compensating gear assemblage 45 interposed in the drive to the differential ring gears the pairs of driving wheels may have different peripheral speeds relatively to each other, and that there will be an equal distribution of the applications of power of each of the wheels of both pairs of the driving wheels irrespective of variations in their peripheral speed and also irrespective of the positions of said wheels with respect to a horizontal plane.

Figure 12:
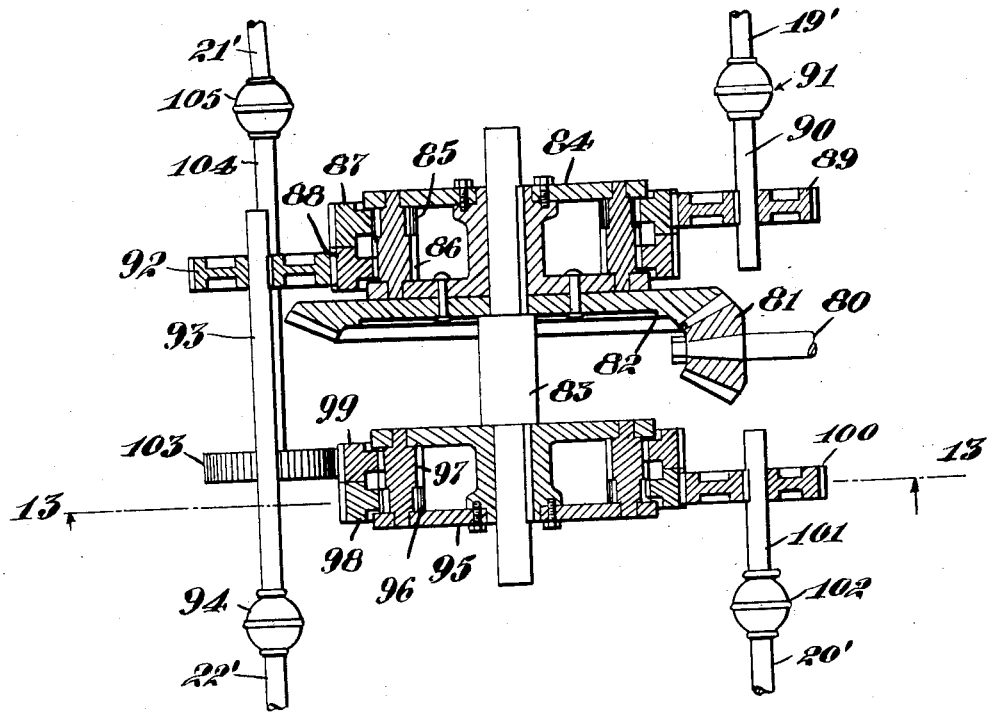
Fig. 12 is a view in horizontal section and plan of a modification of the invention.
Figure 13:
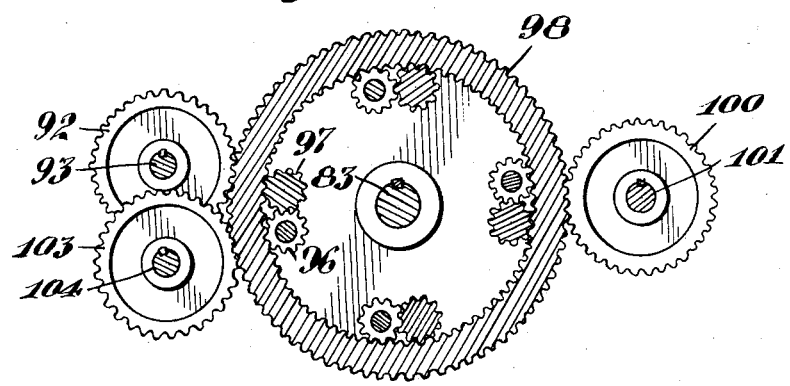
Fig. 13 is a view in section on the line 13—13 of Fig. 12.

In the form of the invention shown in Figs. 12 and 13 the drive shaft 80 is fitted with a beveled pinion 81, meshing with a beveled gear 82, fixed on a first motion shaft 83, journalled in suitable bearings (not shown) and extending at right angles to the drive shaft and disposed on a plane midway between the longitudinal axes of the axles carrying the front and rear pairs of the driving wheels. Fixed on the first motion shaft 83 is a frame structure 84, carrying two sets of pairs of compensating pinions 85 and 86 arranged with their axes extending parallel with the axis of the first motion shaft 83 and disposed in annular arrangement around the first motion shaft. The pairs of pinions 85 and 86 intermesh, and surrounding the sets of pinions is a pair of internally and externally toothed ring gears 87 and 88; the ring gear 87 intermeshing with the compensating pinions 85 and the ring gear 88 intermeshing with the compensating pinions 86. Meshing with the ring gear 87 is a gear 89 fixed on a shaft 90 connecting through a universal joint 91 with an axle member 19' on which is carried one of the driving wheels of the forward pair, and meshing with the ring gear 88 is a gear 92 fixed on a shaft 93 connecting through a universal joint 94 with an axle member 22' on which is carried one of the driving wheels of the rear pair.

Fixed on the first motion shaft 83 is a second frame structure 95 carrying two sets of pairs of compensating gears 96 and 97, complementary to the compensating gears on the frame 84 and disposed in corresponding relation to the first motion shaft, and intermeshing with a pair of ring gears 98 and 99; the ring gear 98 meshing with the set of pinions 96 and the ring gear 99 meshing with the pinions 97, and the pairs of pinions 96 and 97 intermeshing with each other. Meshing with the ring gear 98 is a gear 100 mounted on a shaft 101 connecting through a universal joint 102 with an axle member 20' carrying the driving wheel of the forward pair arranged opposite the wheel carried on the axle member 19'. Meshing with the ring gear 99 is a gear 103 fixed on a shaft 104 connecting through a universal joint 105 with an axle member 21' carrying the wheel of the rear driving pair disposed opposite the wheel carried on the shaft 22'.

In the operation of the modified form of the invention just described rotation of the drive shaft 80 effects rotation of the first motion shaft 83 and causes the frame structures 84 and 95 to rotate in unison and carry the sets of compensating pinions 85, 86, 96 and 97 in a circular path of travel around the axis of the first motion shaft 83, which also effects rotation of the ring gears 87, 88, 98 and 99 so as to drive the wheel axles collectively yet independently of each other through the driving connections between the respective ring gears and the several axle members. The differential action of the ring gears and their associated pinions affords full compensation throughout the several driving wheels and insures uniform application of driving power to each of the wheels and yet permits the desired variation in relative peripheral speeds of the driving wheels in relation to each other.

While I have shown and described a specific embodiment of my invention I do not limit myself to the exact details of construction and arrangement shown but may employ such changes in the parts and in the construction and arrangement of parts as occasion may require without departing from the spirit of the invention as defined in the accompanying claims.

I claim:—

1. In a vehicle drive, at least two pairs of driving wheels, a differential gear for each pair of said wheels, axles carrying said wheels connected to said differential gears, housings for said gears and axles, substantially aligned shafts, gears connecting each of said shafts to said differential gears, a universal joint connecting said shafts intermediate said differential gears, sleeves fixed on said housings encompassing said shafts terminating at the opposite sides of the universal joint, a hanger fixed on one of said sleeves, a hanger turnable on the other of said sleeves, said hangers having overlapping extensions projecting to one side of the universal joint, and a pivot pin connecting said extensions.

2. In a vehicle drive, at least two pairs of driving wheels, a differential gear for each pair of said wheels, axles carrying said wheels connected to said differential gears, housings for said gears and axles, substantially aligned shafts, gears connecting each of said shafts to said differential gears, a universal joint connecting said shafts intermediate said differential gears, sleeves fixed on said housing encompassing said shafts terminating on opposite sides of the universal joints, a hanger loose on one of said sleeves, a yoke formed on said hanger extending beneath the universal joint, a pivot pin carried by said yoke, a hanger fixed on the other sleeve, and an extension on said hanger projecting into said yoke having an elongated slot through which said pivot pin projects.

In testimony whereof I have affixed my signature.

MAHLON H. WOLFF.